(12) United States Patent
Ren

(10) Patent No.: US 7,679,224 B2
(45) Date of Patent: Mar. 16, 2010

(54) CIRCUIT FOR PROTECTING COMPUTER

(75) Inventor: Ze-Shu Ren, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipai Hsien (TW)

( * ) Notice: Subject to any disclaimer, the term of this patent is extended or adjusted under 35 U.S.C. 154(b) by 413 days.

(21) Appl. No.: 11/778,084

(22) Filed: Jul. 16, 2007

(65) Prior Publication Data

US 2008/0151452 A1   Jun. 26, 2008

(30) Foreign Application Priority Data

Dec. 22, 2006   (CN) .......................... 2006 2 0016699

(51) Int. Cl.
 *H01H 83/00* (2006.01)
 *H02H 3/00* (2006.01)
(52) U.S. Cl. ........................................ 307/130; 307/97
(58) Field of Classification Search .................... 307/97, 307/130
 See application file for complete search history.

(56) References Cited

U.S. PATENT DOCUMENTS 6,970,338 B2 * 11/2005 Ju ................................ 361/58
 2006/0212550 A1 * 9/2006 Oda ........................... 709/220

* cited by examiner

*Primary Examiner*—Fritz M Fleming
*Assistant Examiner*—Dru M Parries
(74) *Attorney, Agent, or Firm*—Frank R. Niranjan

(57) ABSTRACT

A circuit is used for preventing a computer from being powered up before a CPU voltage of the computer is prepared properly. The circuit includes a power supply for providing power to the computer, a power button for powering on the computer system, a power controller, and a switch. The power controller includes an input terminal connected to the power button and an output terminal for electrical connection to the power supply. The input terminal receives a PWRBT# signal when the power button is momentarily triggered, and the output terminal outputs a PSON# signal to the power supply to control the power supply to provide the electrical power to the computer in response to the received PWRBT# signal. The switch is serially connected between the output terminal and the power supply. The switch includes a control terminal monitoring if the CPU voltage is prepared properly so as to control conduction of the switch and further to control connection between the output terminal and the power supply.

9 Claims, 4 Drawing Sheets

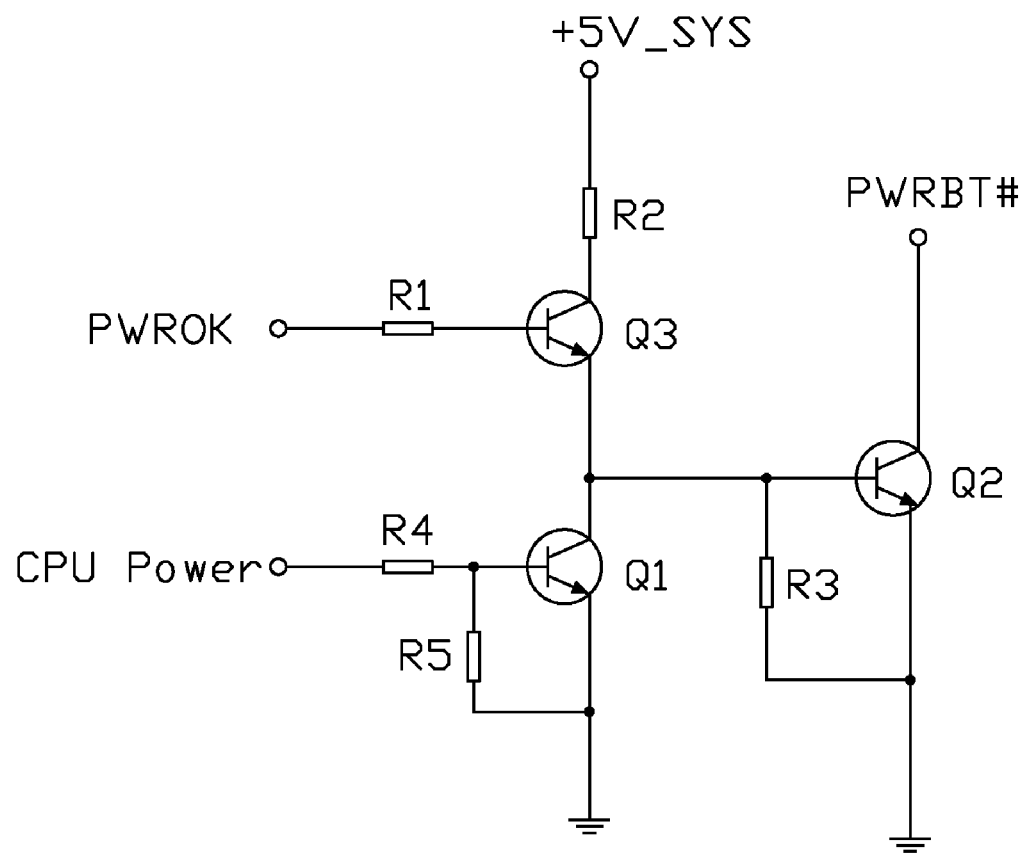
FIG. 4 <PRIOR ART>

CIRCUIT FOR PROTECTING COMPUTER

BACKGROUND

1. Field of the Invention

The present invention relates to a protecting circuit for a computer, and more particularly to a protecting circuit for a computer when a CPU power header is disconnected from a power supply thereof.

2. Description of Related Art

A conventional computer generally includes an ATX power supply with a 20-pin main power connector, and a 4-pin power connector both of which connect to a motherboard thereof. The 4-pin power connector provides a +12V working voltage to a CPU of the motherboard after the power supply is turned on. If an operator carelessly leaves the 4-pin power connector disconnected from a CPU power header on the motherboard when the computer is assembled, the CPU of the motherboard will not be able to run after the computer is turned on. The motherboard and/or its components may be damaged due to this oversight.

In order to protect the motherboard from being damaged due to the oversight, a protecting circuit is provided as shown in FIG. 4. The circuit includes a first transistor Q1, a second transistor Q2, and a third transistor Q3. A base of the first transistor Q1 receives a CPU power signal, and an emitter is connected to ground. A base of the second transistor Q2 is connected to a collector of the first transistor Q1, an emitter is connected to ground, and a collector is configured to receive a PWRBT# signal which is at high level after the computer is on or off and goes low to switch the computer off or on. An emitter of the third transistor Q3 is connected to the collector of the first transistor Q1, a base receives a PWROK signal, which switches from low to high level after the computer is turned on, and a collector is supplied with a +5V voltage source after the computer is turned on. When the computer is turned on without a connection of a CPU power connector of a power supply, the first transistor Q1 is closed. The second and third transistors are turned on due to a high-level PWROK signal to ground the PWRBT# signal for switching off the computer and protect the motherboard from damage due to abnormal CPU power-on voltage applied thereto.

However, the PWRBT# signal switches off the computer via a power controller which directly turns off the power supply of the computer after a 4 second delay when the PWRBT# signal is grounded and goes from high to low level if no power-on voltage for CPU is provided. Therefore, the motherboard is still at risk during that delay time.

What is needed, therefore, is a circuit to power off the computer more quickly when the computer is turned on without normal CPU power to a motherboard thereof.

SUMMARY

A circuit is used for preventing a computer from being powered up before a CPU voltage of the computer is prepared properly. The circuit includes a power supply for providing power to the computer, a power button for powering on the computer system, a power controller, and a switch. The power controller includes an input terminal connected to the power button and an output terminal for electrical connection to the power supply. The input terminal receives a PWRBT# signal when the power button is momentarily triggered, and the output terminal outputs a PSON# signal to the power supply to control the power supply to provide the electrical power to the computer in response to the received PWRBT# signal. The switch is serially connected between the output terminal and the power supply. The switch includes a control terminal monitoring if the CPU voltage is prepared properly so as to control conduction of the switch and further to control connection between the output terminal and the power supply.

Other advantages and novel features of the present invention will become more apparent from the following detailed description of preferred embodiment when taken in conjunction with the accompanying drawings, in which:

BRIEF DESCRIPTION OF THE DRAWINGS

FIG. 2 is a time diagram of signals of the circuit shown in FIG. 1 when CPU power is normally applied after the power supply is turned on;

FIG. 3 is a time diagram of signals of the circuit shown in FIG. 1 when no CPU power is applied after the power supply is turned on; and FIG. 4 is a conventional protection circuit for powering off a turned-on computer when there is no CPU power to its motherboard.

DETAILED DESCRIPTION OF THE EMBODIMENT

Figure 1:
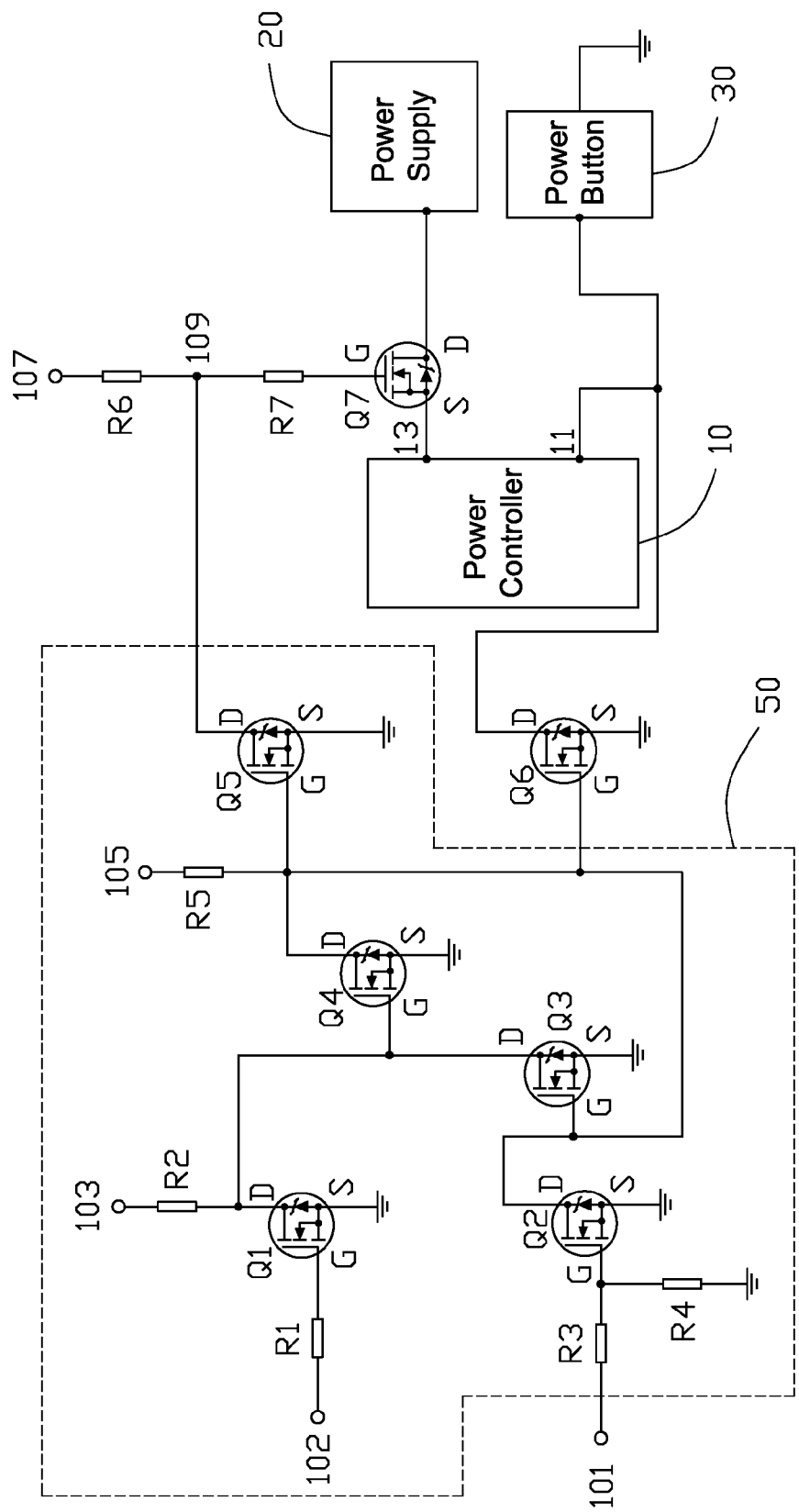
FIG. 1 is a circuit for powering off a turned-on power supply of a computer when CPU power is not applied in accordance with a preferred embodiment of the present invention.

Referring to FIG. 1, a circuit for protecting a computer in accordance with a preferred embodiment of the present invention includes a power controller 10, a power supply 20, a power button 30, and a monitoring circuit 50.

The power controller 10 is used to turn the power supply 20 on or off. The power controller 10 may be a south bridge chip or other controller chip in the computer. The power controller 10 includes an input pin 11 connected to the power button 30, and an output pin 13 connected to the power supply 20 to control the power supply 20.

For example, if the power button 30 is momentarily pushed when the power supply 20 is off, a logical low PWRBT# signal is sent to the power controller 10 which in turn supplies a logical low PSON# signal to the power supply 20, turning on the power supply 20. After the power supply 20 turns on, the power supply 20 sends a logical high signal PWROK to the computer to indicate the power is normal. The signal PWROK is sent about 400 milliseconds later than the PWRBT# signal. If the power button 30 is depressed and held in for 4 seconds while the power supply 20 is on, the logical low PWRBT# signal is continuously sent to the power controller 10 for 4 seconds to stop the output of the logical low PSON# signal to the power supply 20, turning off the power supply 20.

A switch Q7 is connected in series between the output pin 13 of the power controller 10 and the power supply 20 to control connection between the output pin 13 and the power supply 20. In the present embodiment, the switch Q7 is an N channel junction field effect transistor. Similar elements such as NPN type transistor also can be used as the switch Q7. A source terminal of the transistor Q7 is connected to the output pin 13, a drain terminal is connected to the power supply 20, and a gate terminal is connected to a node 107 via serially connected resistors R6 and R7. A standby high-level voltage signal is applied to the node 107, to keep the node 107 high at all times, even when the power supply 20 is off. So the transistor Q7 is kept in conducting status in normal situation.

The monitoring circuit 50 includes transistors Q1, Q2, Q3, Q4, and Q5. A gate terminal of the transistor Q1 is connected to a node 102 via a resistor R1. The PWROK signal is applied to the node 102. A source terminal of the transistor Q1 is connected to ground. A drain terminal of the transistor Q1 is connected to a node 103. The standby high-level voltage signal is applied to the node 103.

The transistor Q2 has a gate terminal connected to a node 101 that is supplied with a CPU power signal from the motherboard, and a source terminal connected to ground. When the 4-pin power connector is not connected to the CPU power header on the motherboard after the computer is powered on, the CPU power signal is set at low level, and when connected, the CPU power signal is set at high level. A voltage-divided resistor R4 is connected between the gate terminal of the transistor Q2 and ground.

The transistor Q3 has a gate terminal connected to a drain terminal of the transistor Q2, a drain terminal connected to the drain terminal of the transistor Q1, and a source terminal connected to ground. The transistor Q4 has a gate terminal connected to the drain terminal of the transistor Q1, a drain terminal connected to the gate terminal of the transistor Q3, and a source terminal connected to ground.

The transistor Q5 has a gate terminal connected to the drain terminal of the transistor Q2, a drain terminal connected to a node 109 between the resistor R6 and resistor R7, and a source connected to ground. The gate terminal of the transistor Q5 is further connected to a node 105 via a resistor R5. A signal logically opposite to the PSON# signal is applied to the node 105. That is, if PSON# is high, then the node 105 is low, and vice versa.

A transistor Q6 has a gate terminal connected to the drain terminal of the transistor Q2, a drain terminal connected to the input terminal 11 of the power controller 10, and a source terminal connected to ground.

Figure 2:
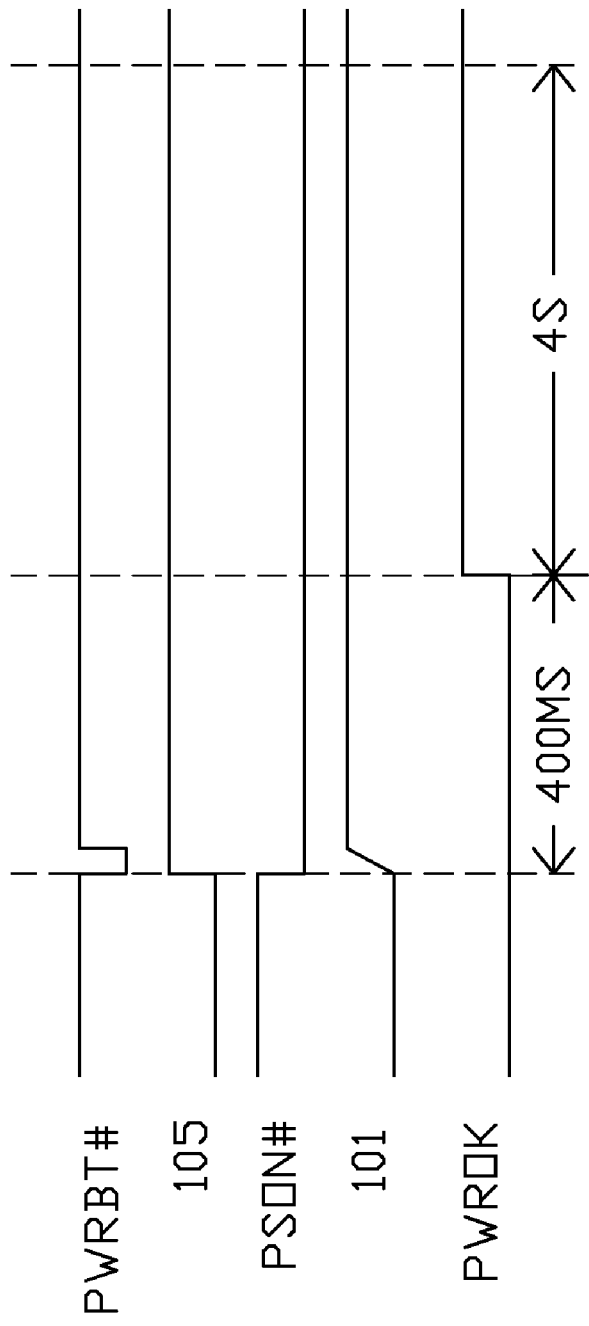

The working principle of the protecting circuit of the embodiment is described below:

Referring to FIGS. 1 and 2, before the computer starts up, the nodes 103, 107 are high, the transistors Q4 and Q7 are on. When the power button 30 is momentarily pushed, the logical low PWRBT# signal is sent to the power controller 10 which in turn supplies a logical low PSON# signal to the power supply 20, turning on the power supply 20. Simultaneously, the node 105 is set high.

Because the transistor Q4 is on, the gate terminals of the transistors Q5 and Q6 are connected to ground via the transistor Q4, therefore, transistors Q5 and Q6 are off. The transistor Q7 remains, and the power supply 20 continues to provide power to the computer.

About 400 milliseconds later, the node 102 receives the logical high PWROK signal. The transistor Q1 is turned on. The gate terminal of the transistor Q4 is connected to ground turning off the transistor Q4. The gate terminals of the transistors Q5 and Q6 are no longer connected to ground via the transistor Q4.

Then, if the 4-pin power connector is connected to the CPU power header on the motherboard, the node 101, which is supplied with the CPU power signal, is high, and the transistor Q2 is turned on. The gate terminals of the transistors Q5 and Q6 are now connected to ground via the transistor Q2, turning off the transistors Q5 and Q6. The transistor Q7 remains on, and the power supply 20 continues providing power to the computer.

Figure 3:
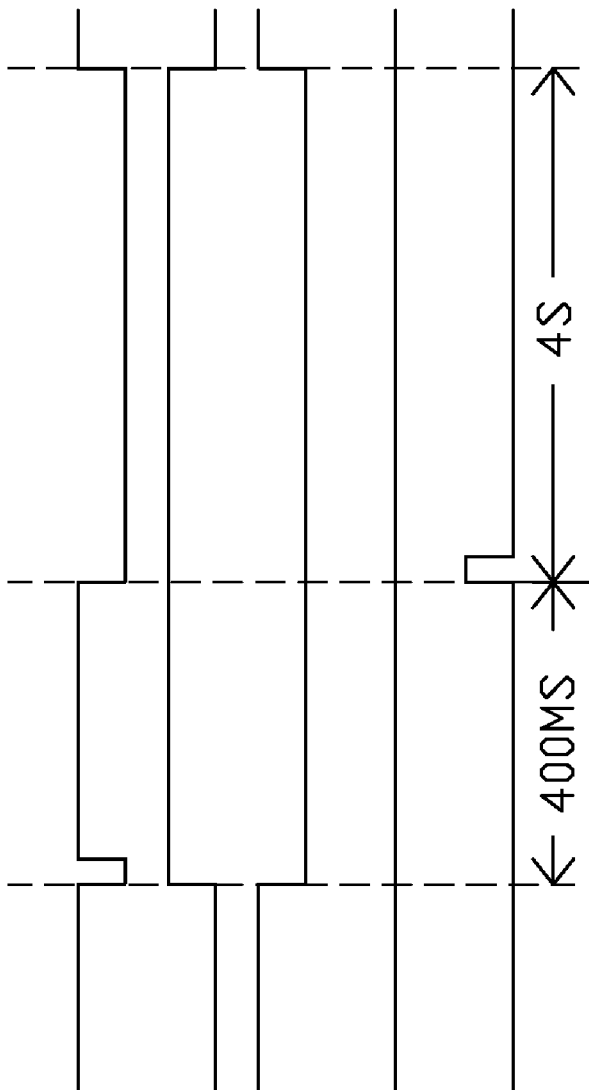

Referring to FIGS. 1 and 3, if the 4-pin power connector is not connected to the CPU power header on the motherboard, the node 101 is set low level, the transistor Q2 is off. The gate terminals of the transistors Q5 and Q6 don't connect to ground, but instead, connect to the high-level node 105, and the transistors Q5 and Q6 turn on. The gate terminal of the transistor Q3 is also connected to the node 105, turning on the transistor Q3. The gate terminal of the transistor Q4 is connected to ground via the transistor Q3. So the transistor Q4 is turned off.

Because the transistor Q5 is on, the node 109 and the gate terminal of the transistor Q7 are connected to ground via the transistor Q5. The transistor Q7 is turned off. The output pin 13 of the power controller 10 cannot transmit the logical low PSON# signal to the power supply 20. The power supply 20 stops providing power to the computer. So the computer is protected from damage.

Simultaneously, the logical high PWROK signal turns off, and node 102 is set low, and the transistor Q1 is turned off. Because the transistor Q3 is on and connecting the gate terminal of the transistor Q4 ground, the transistor Q4 remains off.

Because the transistor Q6 is turned on, the input pin 11 of the power controller 10 is connected to ground via the transistor Q6 to persistently receive logical low PWRBT# signal. The power controller 10 stops outputting the logical low PSON# signal 4 seconds later. Then the circuit for protecting computer is set back to the original status, and the computer system can be powered on after the 4-pin power connector is connected to the CPU power header on the motherboard.

The circuit of the present invention can turn off power to the computer within 400 milliseconds, which is much quicker than the previous circuit. Therefore, there is less risk to the computer.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for preventing a computer from being powered up before a CPU voltage of the computer is prepared properly, the circuit comprising:

a power supply for providing power to the computer;

a power button for powering on the computer;

a power controller comprising an input terminal connected to the power button and an output terminal for electrical connection to the power supply, the power controller being configured for receiving a PWRBT# signal via the input terminal thereof when the power button is momentarily triggered, and outputting a PSON# signal to the power supply via the output terminal to control the power supply to provide the electrical power to the computer, in response to the received PWRBT# signal;

a switch serially connected between the output terminal of the power controller and the power supply, the switch comprising a control terminal configured for monitoring if the CPU voltage is prepared properly so as to control conduction of the switch and further to control connection between the output terminal and the power supply.

2. The circuit as described in claim 1, wherein the switch includes a transistor, the transistor having a gate terminal serving as the control terminal, a source terminal connected to the output pin, and a drain pin connected to the power supply.

3. The circuit as described in claim 2, further comprising a monitoring circuit for monitoring weather the CPU voltage of the computer is prepared properly, wherein the gate terminal of the transistor is connected to a high-level voltage node thereof via at least one resistor to keep the transistor conducting in a normal situation, and is further connected to the monitoring circuit, for causing non-conduction of the transistor when the CPU voltage of the computer is not prepared properly.

4. The circuit as described in claim 3, wherein the monitoring circuit comprises a first transistor, a second transistor, a fourth transistor, and a fifth transistor, the first transistor having a gate terminal which is applied with a logical high PWROK signal after the PWRBT# signal is created, a drain terminal connected to a high-level voltage node thereof, a source terminal connected to ground, the second transistor having a gate terminal sensing the CPU voltage, a drain terminal applied with a signal logically opposite to the PSON# signal, and a source terminal connected to ground, the fourth transistor having a gate terminal connected to a drain of the second transistor, a drain terminal connected to the high-level voltage node thereof, and a source terminal connected to ground, the fifth transistor having a gate terminal connected to the drain terminal of the fourth transistor, a drain terminal connected to the control terminal of the switch, and a source terminal connected to ground.

5. The circuit as described in claim 4, wherein the PWROK signal is sent about 400 milliseconds later than the PWRBT# signal.

6. The circuit as described in claim 4, wherein the monitoring circuit further comprises a third transistor which has a gate terminal connected to the drain terminal of the second transistor, a drain terminal connected to the drain terminal of the second transistor, and a source terminal connected to ground.

7. The circuit as described in claim 6, wherein the monitoring circuit further comprises a sixth transistor, the sixth transistor comprises a gate terminal connected to the high-level voltage node thereof, a drain terminal connected to the input terminal of the power controller, and a source terminal connected to ground.

8. The circuit as described in claim 1, wherein the PWRBT# signal is a low-level voltage signal when the power button is triggered.

9. The circuit as described in claim 1, wherein the PSON# signal is a low-level voltage signal.

* * * * *